US010664655B2

(12) United States Patent
Craymer, III

(10) Patent No.: US 10,664,655 B2
(45) Date of Patent: May 26, 2020

(54) METHOD AND SYSTEM FOR LINEAR GENERALIZED LL RECOGNITION AND CONTEXT-AWARE PARSING

(71) Applicant: Loring G. Craymer, III, Temple City, CA (US)

(72) Inventor: Loring G. Craymer, III, Temple City, CA (US)

(*) Notice: Subject to any disclaimer, the term of this patent is extended or adjusted under 35 U.S.C. 154(b) by 0 days.

(21) Appl. No.: 16/038,111

(22) Filed: Jul. 17, 2018

(65) Prior Publication Data

US 2019/0012309 A1   Jan. 10, 2019

Related U.S. Application Data

(63) Continuation of application No. 14/796,782, filed on Jul. 10, 2015, now Pat. No. 10,055,399.

(60) Provisional application No. 62/023,771, filed on Jul. 11, 2014.

(51) Int. Cl.
*G06F 40/20* (2020.01)
*G06F 40/211* (2020.01)

(52) U.S. Cl.
CPC .................. *G06F 40/211* (2020.01)

(58) Field of Classification Search
None
See application file for complete search history.

(56) References Cited

U.S. PATENT DOCUMENTS

| 7,089,541 | B2 | 8/2006 | Ungar |
| 8,296,744 | B2 | 10/2012 | Langworthy et al. |
| 2003/0106049 | A1 | 6/2003 | Ungar |
| 2004/0225999 | A1* | 11/2004 | Nuss .......................... G06F 8/31 717/114 |
| 2006/0235811 | A1* | 10/2006 | Fairweather ............ G06F 8/427 706/12 |
| 2008/0228467 | A1 | 9/2008 | Womack et al. |

(Continued)

FOREIGN PATENT DOCUMENTS

| CN | 102171679 A | 8/2011 |
| CN | 102202242 A | 9/2011 |
| WO | 20111015222 A1 | 2/2011 |

OTHER PUBLICATIONS

Advisory Action from U.S. Appl. No. 14/796,782, dated May 2, 2017, 5 pages.

(Continued)

*Primary Examiner* — Qian Yang
(74) *Attorney, Agent, or Firm* — Nicholson, De Vos, Webster & Elliott, LLP

(57) ABSTRACT

A computer system and method of grammar analysis to generate code for runtime recognition to produce a list or graph representation of multiple lists of directions to be followed for a given sentence during a subsequent parse. The computer system implementing the method to parse grammar to create an intermediate representation, construct a graph for analysis that represents all features of a grammar, including recursion, alternation, grouping of alternatives, and looping, process each decision point in the graph to generate the intermediate representation, generate code for recognition functions that return lists of directions for use in runtime parse decisions, and patch each decision point token to reference or inline a top level recognition code for each decision point.

20 Claims, 14 Drawing Sheets

(56) References Cited

U.S. PATENT DOCUMENTS

| | | | |
|---|---|---|---|
| 2009/0306964 | A1 | 12/2009 | Bonnet et al. |
| 2009/0313613 | A1 | 12/2009 | Ben-Artzi et al. |
| 2010/0037213 | A1 | 2/2010 | Meijer et al. |
| 2012/0191446 | A1 | 7/2012 | Binsztok et al. |
| 2012/0310648 | A1* | 12/2012 | Shimizu ................ G06F 17/271 704/257 |
| 2014/0136188 | A1 | 5/2014 | Wroczynski et al. |
| 2015/0347375 | A1 | 12/2015 | Tremblay et al. |
| 2015/0370781 | A1 | 12/2015 | Galle |
| 2016/0062982 | A1* | 3/2016 | Wroczynski ........ G06F 17/2872 704/9 |

OTHER PUBLICATIONS

Bell, R., "A Beginner's Guide to Big O Notation," Jun. 23, 2009, downloaded from https://rob-bell.net/2009/06/a-beginners-guide-to-big-o-notation/ on Nov. 1, 2017, 8 pages.
De Marneffe, et al., "Stanford Typed Dependencies Manual," Revised for the Stanford Parser v. 3.5.2 in Apr. 2015, Sep. 2008, 28 pages.
Extended European Search Report for Application No. 15818621.3, dated Feb. 12, 2018, 6 pages.
Final Office Action from U.S. Appl. No. 14/796,782, dated Dec. 18, 2017, 21 pages.
Final Office Action from U.S. Appl. No. 14/796,782, dated Feb. 15, 2017, 9 pages.
International Preliminary Report on Patentability for Application No. PCT/US2015/040049, dated Jan. 26, 2017, 6 pages.
International Search Report and Written Opinion for Application No. PCT/US2015/040049, dated Oct. 30, 2015, 7 pages.
Knuth, D.E., "On the Translation of Languages from Left to Right," Information and Control, vol. 8, 1965, pp. 607-639.
Non-Final Office Action from U.S. Appl. No. 14/796,782, dated Jul. 21, 2017, 20 pages.
Non-Final Office Action from U.S. Appl. No. 14/796,782, dated Oct. 5, 2016, 10 pages.
Notice of Allowance from U.S. Appl. No. 14/796,782, dated Apr. 17, 2018, 11 pages.
Parr, T., "The Definitive ANTLR Reference," Building Domain Specific Languages, The Pragmatic Programmers, May 31, 2007, XP055447657, 369 pages, downloaded from https://doc.lagout.org/programmation/pragmatic%20Programmers/The%20Definitive%20ANTLR%20reference.pdf on Feb. 5, 2018.
Scott, et al., "GLL Parsing," Electronic Notes in Theoretical Computer Science, vol. 253, Sep. 17, 2010, pp. 177-189.
Wikipedia "Big O notation," downloaded from https://en.wikipedia.org/w/index.php?title=Big_O_notation&oldid=804200924 on Nov. 1, 2017, 16 pages.
Besova, et al., "Grammar-based model transformations," Proceedings of the 2014 Federated Conference on Computer Science and Information Systems, ACSIS, vol. 2, Sep. 2014, pp. 1601-1610.
First Office Action, Chinese Appl. No. 201580037492.4, dated Aug. 28, 2019, pp. 1-12.
Liu, S., "The Analysis and Design of Gaussian Lexical Analyzer and Syntax-Parser based on ANTLR," Dec. 15, 2009, pp. 1-53 (English Abstract).
Quesada, et al., "Parsing Abstract Syntax Graphs with ModelCC," In Proceedings of the 2nd International Conference on Model-Driven Engineering and Software Development (MODELSWARD-2014), Jan. 2014, pp. 151-157.

* cited by examiner

ADD POINTER 0 TO ARRAY

ADD POINTER 1 TO ARRAY

ADD LOOPBACKS FROM ARRAY AND ARRAY'

METHOD AND SYSTEM FOR LINEAR GENERALIZED LL RECOGNITION AND CONTEXT-AWARE PARSING

CROSS-REFERENCE TO RELATED APPLICATIONS

This application is a continuation of U.S. application Ser. No. 14/796,782, filed Jul. 10, 2015 (now U.S. Pat. No. 10,055,399, issued Aug. 21, 2018), which claims the benefit of U.S. Provisional Application No. 62/023,771, filed Jul. 11, 2014, which is hereby incorporated by reference.

FIELD OF THE INVENTION

The embodiments of the invention as illustrated and described herein are related to parsing of strings of symbols, in a formal language, according to rules of a formal grammar. Specifically, the embodiments provide an improved generic LL (left-to-right, leftmost derivation) parsing process having O(n) performance in the absence of ambiguity.

BACKGROUND

Parsing (also referred to as syntactic analysis) is a process of analyzing a set of symbols that may be in a string or similar format, where a 'string' is sequence of items in this case symbols where the sequence is finite and the symbols are selected from a set of possible symbols referred to as an alphabet. The parsing process can be applied to natural languages, computer languages and similar systems including DNA sequences. The parsing process applies a set of rules of formal grammar specific to the language being processed. The parsing process is a computer implemented process and the term is used in the sense understood by the field of computer science and more specifically within the field of computational linguistics.

Within computational linguistics the parsing process is further understood to be used to refer to the formal analysis by a computer processor and program of a sentence or other string of words in a natural or computer language into its constituents, resulting in a parse tree showing the syntactic relation of each constituent to each other constituent. This parse tree can also contain semantic information and other relevant information about the sentence or string of words being processed.

In some applications within computer science, the parsing process is used in the analysis of computer languages and involves the syntactic analysis of an input code into its component parts in order to facilitate the subsequent functions of compilers and/or interpreters that function to convert code written in one computer language into an executable form, i.e. a computer language that a computer processor is capable of executing.

SUMMARY

A computer system and method of grammar analysis to generate code for runtime recognition to produce a list or graph representation of multiple lists of directions to be followed for a given sentence during a subsequent parse. The computer system implementing the method to parse grammar to create an intermediate representation, construct a graph for analysis that represents all features of a grammar, including recursion, alternation, grouping of alternatives, and looping, process each decision point in the graph to generate the intermediate representation, generate code for recognition functions that return lists of directions for use in runtime parse decisions, and patch each decision point token to reference or inline a top level recognition code for each decision point.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 7 is a flowchart of the general framework.

FIG. 8 is a flowchart of the process of adding to a direction list.

FIG. 9 is a flowchart of the process of constructing a direction graph.

DETAILED DESCRIPTION

Figure 1:
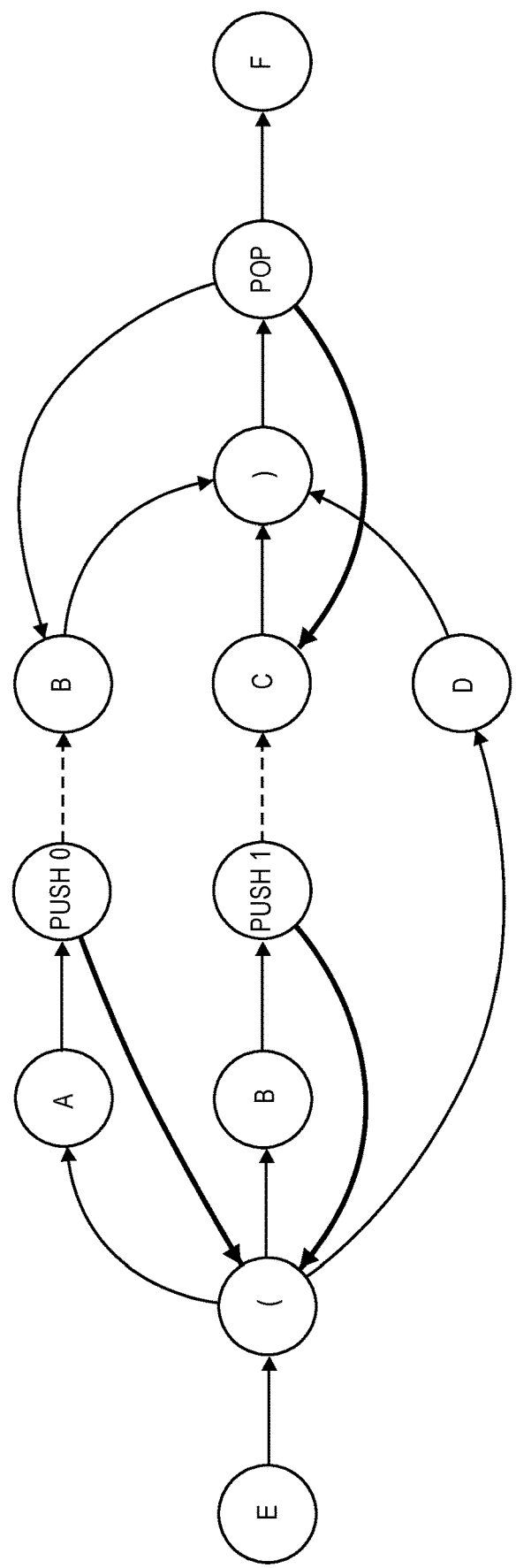
FIG. 1 is a flowchart of one embodiment of a graphical representation of code.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations depicted in the flow diagrams in the attached Figures will be described with reference to the exemplary embodiments shown in the attached Figures. However, it should be understood that the operations depicted in the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video).

Overview

Generic parsing methods in the current art have $O(n^3)$ performance. The embodiments herein describe a method and system for a parsing process that has $O(n)$ performance in the absence of ambiguity (i.e., where there are multiple alternate interpretations for a given sequence of "characters;" in natural languages, these are termed "puns"). The parsers created according to the principles and techniques described herein function by first carrying out a recognition phase that generates sequences of directions for navigating decision points, followed by or interleaved with a parsing phase that follows the directions while carrying out all actions that might be used by a compiler, DNA sequence analyzer, or similar component implementing the parsing process to solve a problem that can be handled by a finite state automata.

To generate a recognizer and parser implementing this process, a grammar is represented in two alternate forms: a graph with directed edges connecting vertices representing token types to be matched and an abstract syntax tree (AST). The graph is used to identify decision points (vertices with multiple output edges) and is processed to generate the recognizer code. The AST representation is used to generate the parsing code, including calls to recognizer routines. Typically, an AST representation is generated from a grammar described in terms of productions, the elements for constructing the graph are derived next on a production-by-production basis from this AST form, and then the graph is constructed. During the graph construction, the AST form is elaborated, and some productions are replicated to ensure that decisions are uniquely named; these productions are added to the original AST; the elaborated AST is used to generate the parse code.

Introductory Material

Formal languages are described by grammars composed of "rules" or "productions" that define all legal sequences of "characters" that compose sentences in the language. Context free languages are a variety of formal languages that can be described by context free grammars (CFG), where a context free grammar, G, is defined as

G=(N, T, P, S)

where N is the set of nonterminal symbols, T is the set of terminal symbols (characters) allowed by the language, P is a set of productions (or rewrite rules) of the form n→<sequence of terminals and nonterminals>, with n a nonterminal;

and S is the start symbol (another nonterminal).

For language processing, CFG specifications are augmented by an alternative operator, "|", so that there is a unique production for each n. This is termed Backus-Naur Form (BNF), which is often extended (EBNF) to include grouping of phrases (phrase), and repetition—A* denotes 0 or more occurrences of A, while A+ denotes one or more occurrences and A? denotes 0 or 1 occurrences. As used herein, nonterminals begin with a lower case letter and terminals with an upper case letter; productions are written as a: <sequence of symbols>;

More general formal languages are, in practice, defined in terms of CFGs augmented to support "actions" described in terms of a general purpose programming language, including semantic predicates. A semantic predicate serves to query context information and invalidates an alternative when the predicate evaluates as false.

Graph Representation

Augmented CFGs can be represented in the form of graphs with directed edges connecting vertices ("nodes"), with each vertex being occupied by a single terminal, action, or semantic predicate. Since CFGs support recursion, it is also necessary to add two additional node types, which are needed to support the saving and restoration of return context information; logically, these node types push and pop values from a stack, with the POP node determining which node follows based on the value retrieved from the stack. To understand this, consider the recursive production:

a: A a B

|B a C

|D;

In the first alternative, after recognizing A and recursively invoking a the return path must involve recognizing B; while after recognizing B in the second alternative and recursively invoking a the return path must involve recognizing C. In graph form, before the recursive call (loop back to first invocation of a), it is necessary to insert a PUSH_CONTEXT node; at the end of the production (where the semicolon appears), a POP_CONTEXT node is inserted. For processing convenience, '(' and ')' nodes are also supported—these represent possible decision points (as do the POP_CONTEXT nodes).

If a start production is added of the form s: E a F;

then it is possible to represent the resulting grammar as the graph shown in FIG. 1.

In FIG. 1, the forward arrows are in black, and loopbacks in bold. The dashed arrows represent connections that may or may not be present after construction, but are not followed during code generation. There is one decision point in FIG. 1: the (node. Note that the (and) nodes are implicit in the grammar. Like the (node, the POP node has multiple possible follow nodes, but the choice of directions is determined by the value on the stack, not on matching an input character. The decision as to which path to take from the (node is determined by the next token ("character") taken from the input stream; this is termed an LA(1) decision since it requires only one token of lookahead (LA).

Figure 2:
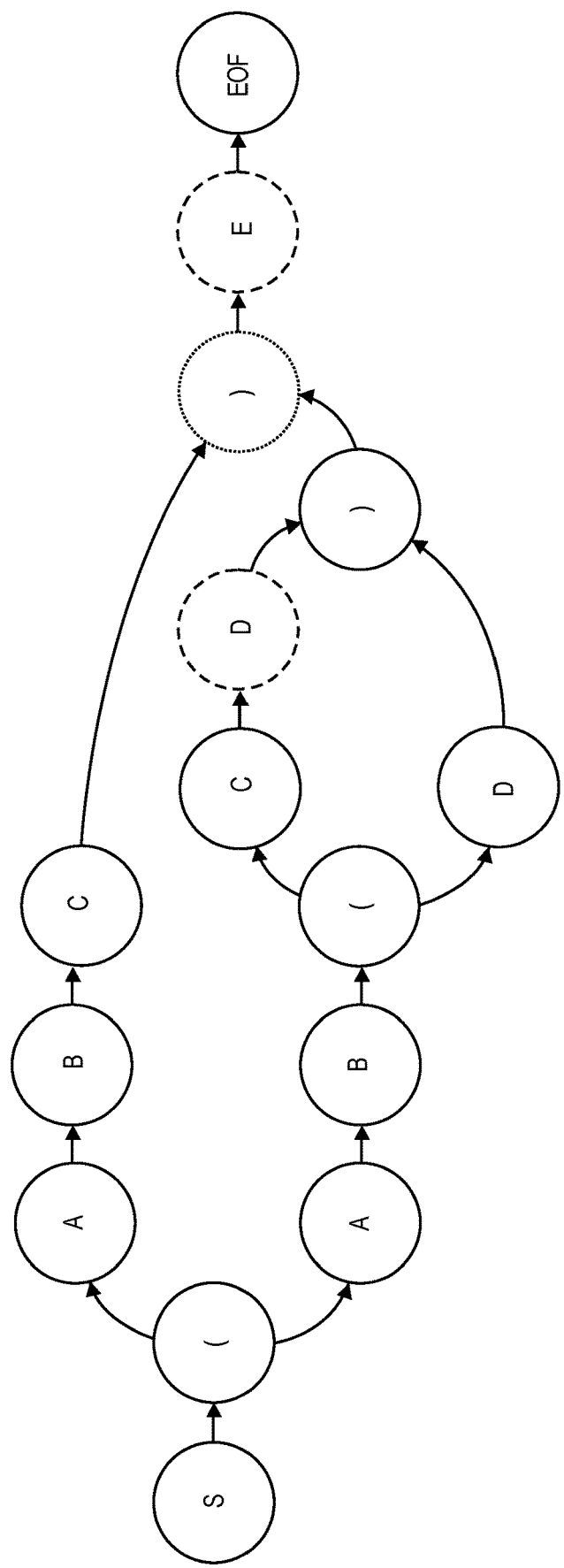
FIG. 2 is a flowchart of one embodiment of a graphical representation of code.

Some decisions, such as those shown in FIG. 2, may require more than one token of lookahead.

There are two decision nodes in FIG. 2: the BLOCK node, and the EOB node. These are present to indicate structure, not values to be matched, so the BLOCK decision is between the sequence A B C and A B D, while the EOB decision is between A B C, A B D, and A B E. Both require three tokens of lookahead (the third token distinguishes C from D and E) to determine which path to take leading from the decision.

Complex decisions may encompass multiple decision points before the proper path can be distinguished, depending on the sequence of tokens to be matched.

Decision Analysis During Grammar Graph Processing

The basic approach to analyzing a decision point is to: build a list of alternative paths from the decision point and compare the next token type along all paths. Singleton token types represent "dropouts": if such a token type is matched, then when that type is matched at runtime, the path from which that token type was found will be valid, and the corresponding path index can be returned and the corresponding path removed from the list. If the remaining paths all represent the same token types, generate code to match that token type and advance the remaining paths to the next token. Otherwise, split the list by token type, and continue the process for each generated list. For each new list, a function is generated and code to call each of the new functions is generated, terminating processing of the previous path list; the body of the new functions will be generated in processing the lists generated at the decision point. Complications arise when a secondary decision point or POP node is encountered; these cases will be described in more detail herein below. Repeated list processing is avoided through the use of a list processing table that is checked after a new list is constructed; if an equivalent list is found in the table, references to the newly created list are replaced with references to the list found in the table and the new list is discarded without further processing. This prevents the analysis process from going into an infinite loop.

In FIG. 2, the analysis process for the first decision—'(' at the left of the figure goes as follows. First, a list of the alternative paths is constructed, pointing to the A's in the figure. Match A code is generated and the paths are advanced to the B nodes. Both match, so match B code is generated. Again, the paths are advanced, then the path list is elaborated past the second decision '(' to have C, C, and D paths. D is a dropout; code is generated for that, and match C code as well. Again, the paths are advanced to the dashed E and D nodes. Code is generated for these dropouts, leaving an empty path list, and analysis terminates.

Decision Analysis at Runtime

At runtime, the recognition (lookahead) phase can either be run to completion before parsing or interleaved, with recognition code being invoked at selected decision points as they are encountered during parsing. The difference between these is that run-to-completion requires recognition code for only the first decision point encountered with no parsing directions returned until parse input is exhausted, while the interleaved recognition returns whenever the alternatives reduce to a single path. This discussion will assume the latter approach; but in either case, parsing directions consist of a list (or multi-list or graph, as will be discussed further herein below) of indices that select paths leading from decision points. As an example, the list {3, 2, 1} directs the parse to take the alternative 3 at the first decision point, alternative 2 at the second decision point, and alternative 1 at the third decision. The fourth decision will require another recognition call.

Special Token Types

In one example implementation described here, most token types referenced in the grammar represent tokens to be matched at run time, but some represent decisions or required processing actions and are present in both the AST and graph representations.

These include:

BLOCK Start of a grouping of alternatives (decision node used when there are alternatives).

EOB End of grouping (decision node for loops).

CLOSURE Decision node for ( . . . )* which is represented in the graph as (( . . . ))?.

POP_CONTEXT As described above.

PUSH_CONTEXT—as described above

SEMANTIC_PREDICATE Predicate decision node. This is a decision node in the graph representation, but not in the AST where it represents an action (code executed at runtime).

SYNTACTIC_PREDICATE Starts a forced lookahead; the alternative following the SYNTACTIC_PREDICATE is valid only if the predicate is matched in its entirety.

END_SYNTACTIC_PREDICATE Ends the lookahead

For BLOCK, EOB, and CLOSURE tokens, it is important that the same tokens that are used in the AST representation are used in the graph representation, so that edits in one representation can be read in the other. These tokens are embedded in "carrier" nodes, either in the AST or graph representation or in both.

AST to Graph Conversion

The basic approach taken is to walk the AST for the start production, generating a sequence of tokens. These are then processed in order to build the grammar graph: nonterminal tokens are expanded inline, excepting for recursive productions, which require special handling. Expansion consists of walking the AST for the referenced production (first encounter), or (subsequent encounters) copying the referenced AST and walking the copy; these walks generate sequences of tokens which are processed in order, also expanding nonterminals as they are encountered. When copying, the copied production is renamed, as is the nonterminal reference. Recursive productions are the exception to inline expansion; they are transformed to loops on the fly.

Dealing with Recursion

To track recursion, a stack of nonterminal names is kept that tracks rule nesting during graph construction; before adding another level of nesting, a nonterminal is checked against the contents of the stack; if present, a PUSH_CONTEXT node is added to the graph and to an array of context values for the recursive production. The node contains a context index value which is set to its offset into the array. When expansion of the recursive production is complete, the array is used to create loopbacks from the PUSH_CONTEXT nodes to the beginning of the production in the graph; a POP_CONTEXT node is appended to the graph and looped back to the nodes following the PUSH_CONTEXT nodes in the graph. This is shown in FIGS. 3A-D which follows the derivation of the recursion subgraph from FIG. 1.

Figure 3A:
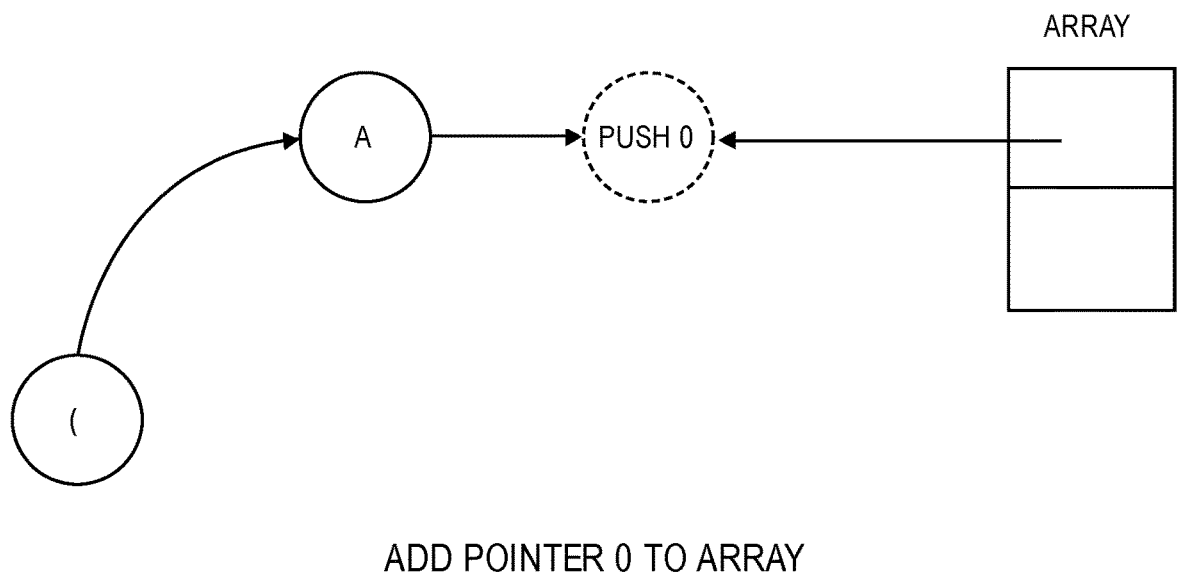
FIGS. 3A-3D are diagrams of one embodiment of the derivation of the recursion subgraph from FIG. 1.
Figure 3B:
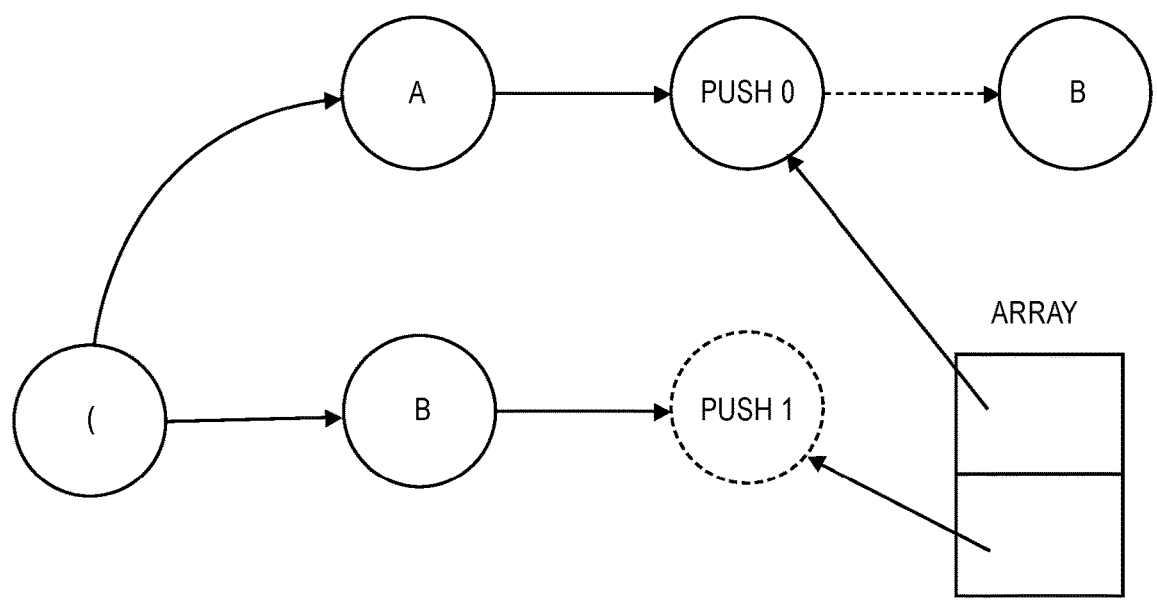
Figure 3C:
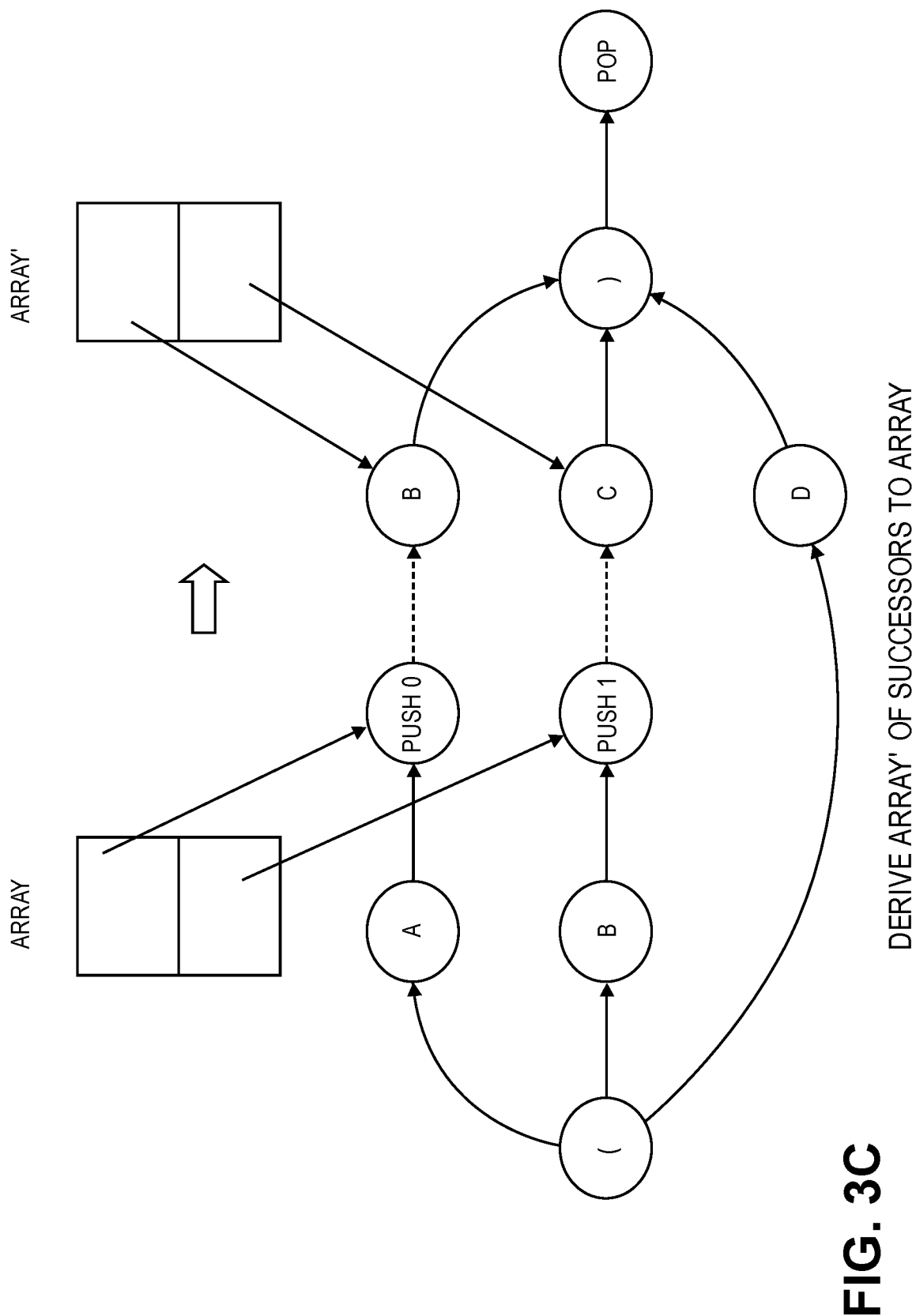
Figure 3D:
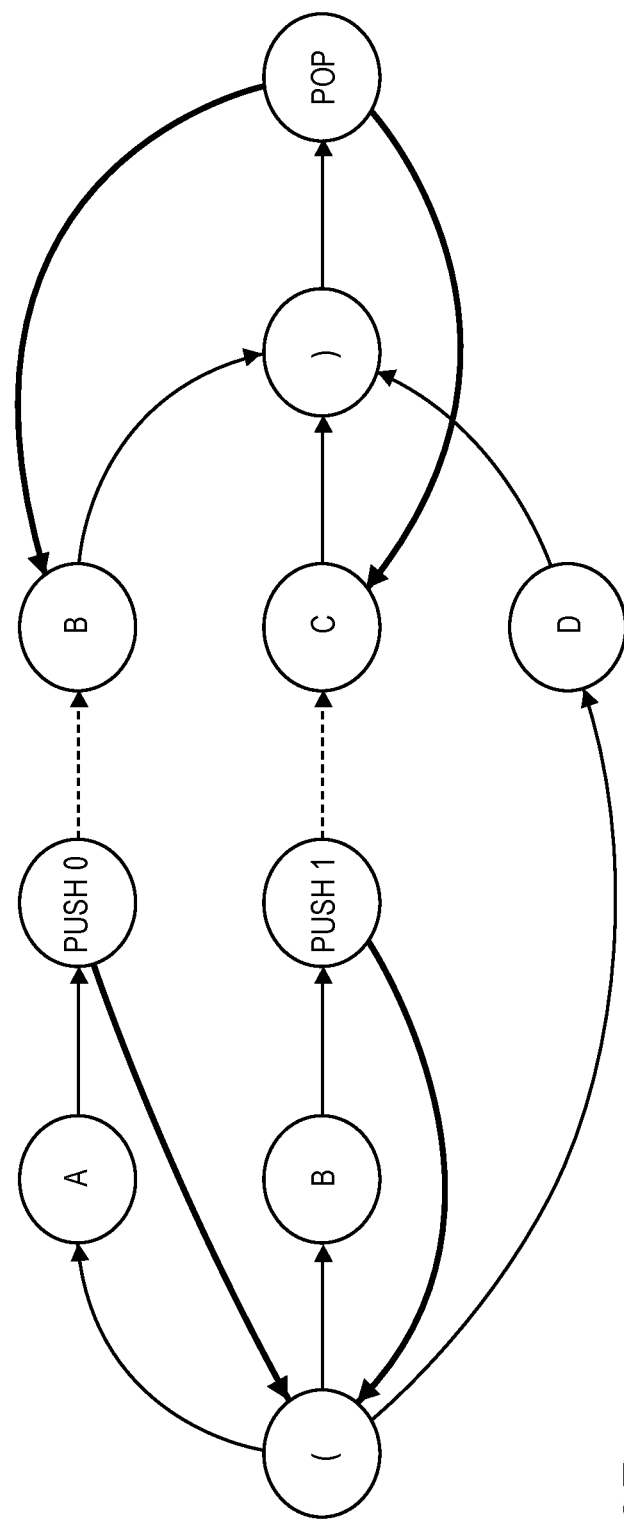

In walking the AST to generate FIGS. 3A-D from the 'a' grammar of paragraphs 0039-0041, first the initial '(' is added to the graph, then the A node, after which the recursive a reference is encountered. At this point, an array is created to hold pointers to PUSH_CONTEXT nodes, a PUSH_CONTEXT node is added to the graph with index 0, and the $0^{th}$ entry of the array is made to point to that PUSH_CONTEXT node; this results in FIG. 3A. Then B is appended to the path and processing continues with the next alternative. The second B (paragraph 0040) is added, and the second recursive call to a is encountered. A PUSH_CONTEXT 1 node is added, and the array updated so that the 1 entry points to that node. FIG. 3B shows the intermediate graph. Then C is added to complete the path. Construction then proceeds to the third path, and D is added. The paths in the decision are then joined with a ')' to reach the end of the production. Since there is an array built for this production, a POP_CONTEXT node is added; this is shown in FIG. 3C. The array is then used to generate the loopbacks shown in FIG. 3D, first to construct the loopbacks from the PUSH_CONTEXT nodes to the original decision node, then the array entries are advanced and the loopbacks from the POP_CONTEXT node added to complete the graph.

Decision Processing

Each decision node in the graph is processed to generate recognition code; the decision nodes can be collected either during graph construction or through a systematic walk of the graph. Processing consists of building and walking lists of alternatives, with each step involving a comparison of values across the alternatives in a list; if all nodes have matching token types, generate match code (or intermediate representation) for that token type and advance each alternative to the next node. When an alternative reaches a token type that matches no other alternative, generate terminating code for that alternative, and continue list processing with the remaining alternatives. Nodes containing predicates, secondary decisions, and PUSH_CONTEXT or POP_CONTEXT force special processing; when a list contains multiple token types after eliminating the singleton types, the list is split into lists for each of the token types, and each list is processed separately.

Dealing with Ambiguity

Ambiguity occurs when alternative paths from a decision point merge (share a common node) during decision processing. Specifically, in this case, the two paths are described as being syntactically ambiguous; that is, there are sequences of tokens that can be interpreted in two different ways. Generalized parsing involves carrying all alternatives forward. Another approach, the parse expression grammar (PEG) approach, arbitrarily selects one alternative and discards the others. PEG-style ambiguity resolution is useful for formal languages; formal languages tend to have limited syntactic ambiguity and no semantic ambiguity.

Using PEG-style ambiguity resolution, there is always only one valid parse, and that parse can be directed by direction lists. For generalized parsing, the recognition stage generates directed graphs instead of lists, graphs that represent multiple lists, each of which can be used to direct a parse.

For generalized parsing, there are multiple valid parses, so the direction lists are replaced by a directed graph that represents all valid direction lists in compact form.

Code Generation Model—Java or other language lacking unrestricted GOTOs

As each list/graph is created, two functions are created for that list/graph: the primary function will hold code to do token processing, while the secondary function is called when exiting the primary function. The exit functions build the list/graph of alternative indices. Every alternative in a list is represented by a data structure that contains a decision index and current graph node. As representations of alternatives are added to the list (either copied from a previous list or constructed de novo from an alternative at a decision node), code is generated to return an index value; if the code is for a newly created representation, then it includes adding its alternative index to the list of indices. As decision processing proceeds, code for token matching is added to the list's primary function, as well as for special processing (semantic predicates, "switch" statements when lists are split, if . . . else . . . then statements for handling semantic predicates, push statements for PUSH CONTEXTs, and pop statements followed by switch statements to handle POP_CONTEXTs. For each recursive production, there is a named stack; the pushes and pops are to the appropriate stack for the context in which they appear.

Looping constructs generate recursive function calls; to support such recursion, it is necessary to treat all lists with the same collection (and placement within the list) of current nodes as equivalent and to map them to a single function in the generated code. This also serves to minimize the generated code by avoiding having multiple functions whose bodies are identical. As path lists are created, they are checked against a list processing table, substituting references to a previous list if one is found in the table, and adding a new entry to the table if no equivalent is found in the table.

Code Generation Model—Languages with unrestricted GOTOs

The unfortunate feature of the above model of code generation is that it can lead to very deep function call stacks. However, only one local variable, "index", is required and defined in each generated function, so the primary function calls could be replaced with GOTOs. That leaves the problem of return invocations of exit functions. These can be handled by "posting" a return function address to a list of return function addresses in the primary functions just before GOTO invocation. That list can be processed in order as (C/C++ code)

```
while (offset<listSize) {
index=(*list[offset++](index);
}
``` with list values being added from the last entry in the list downward towards the first and indexed by "offset", then processed upwards. This avoids any stack depth problems and can be quite fast.

Code Generation Process

Figure 4:
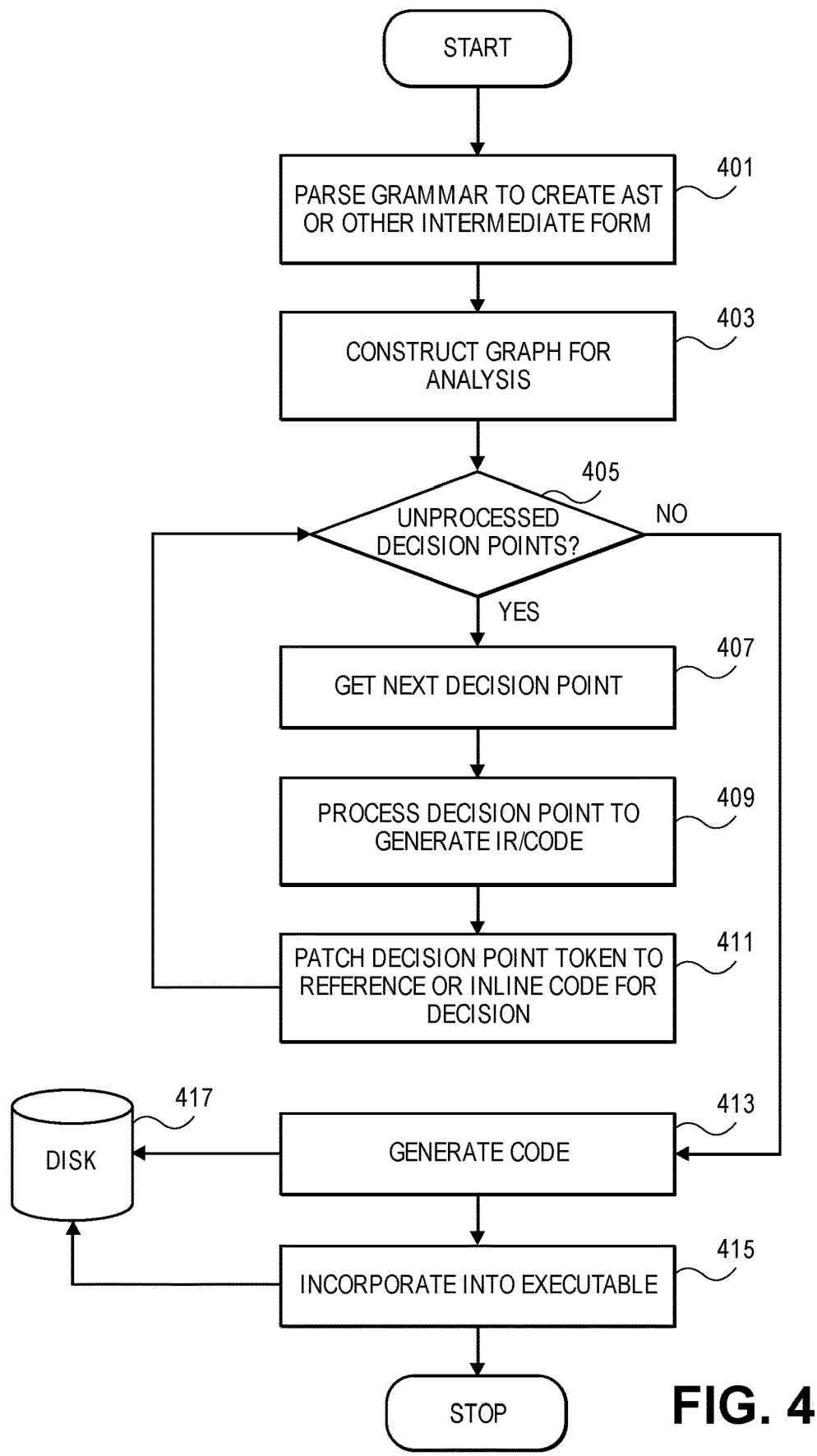
FIG. 4 is a flowchart of a process for code generation.

FIG. 4 is a flowchart of a process for code generation. The process starts by parsing a grammar of the input language to create an AST or similar intermediate form for each grammar production to represent the input language (Block 401).

From the production ASTs the process then constructs a graph for further analysis (Block 403). The graph is constructed walking the grammar, starting with the start production and expanding non-terminals (production references) as they are encountered in the grammar; terminal symbols are added to the graph as they are encountered; blocks—groupings of alternatives—are constructed by inserting a BLOCK vertex that fans out into paths, one for each alternative, which merge at an inserted EOB vertex.

Loops are handled by adding loopback edges between an EOB node and the corresponding BLOCK node, and recursive productions are handled as previously described. Once the entire graph has been completed, then the recognizer-generating process begins to traverse the graph to identify decision points. As each decision point is encountered during the traversal, it is used as the starting point for decision processing. A check is made whether there are remaining decision points to process (Block 405), if there are no remaining decision points to process then the process generates the parse code (Block 413) and stores it to a storage device (Block 417). In some embodiments, the generated code can then be incorporated into an executable or similar code that can be utilized by machines or humans (Block 415).

If all of the decision points have not yet been processed, then the process retrieves the next decision point (Block 407). The decision point is processed to generate either an intermediate representation (IR) or code (Block 409). The decision point token is patched to reference or to inline code for the decision (Block 411); that allows the parsing code generated from a whole grammar representation to reference the recognition functions. The traversal continues by checking whether further decision points remain to be processed (Block 405) and if so continues to process the next decision point until all of the decision points have been processed.

Figure 5:
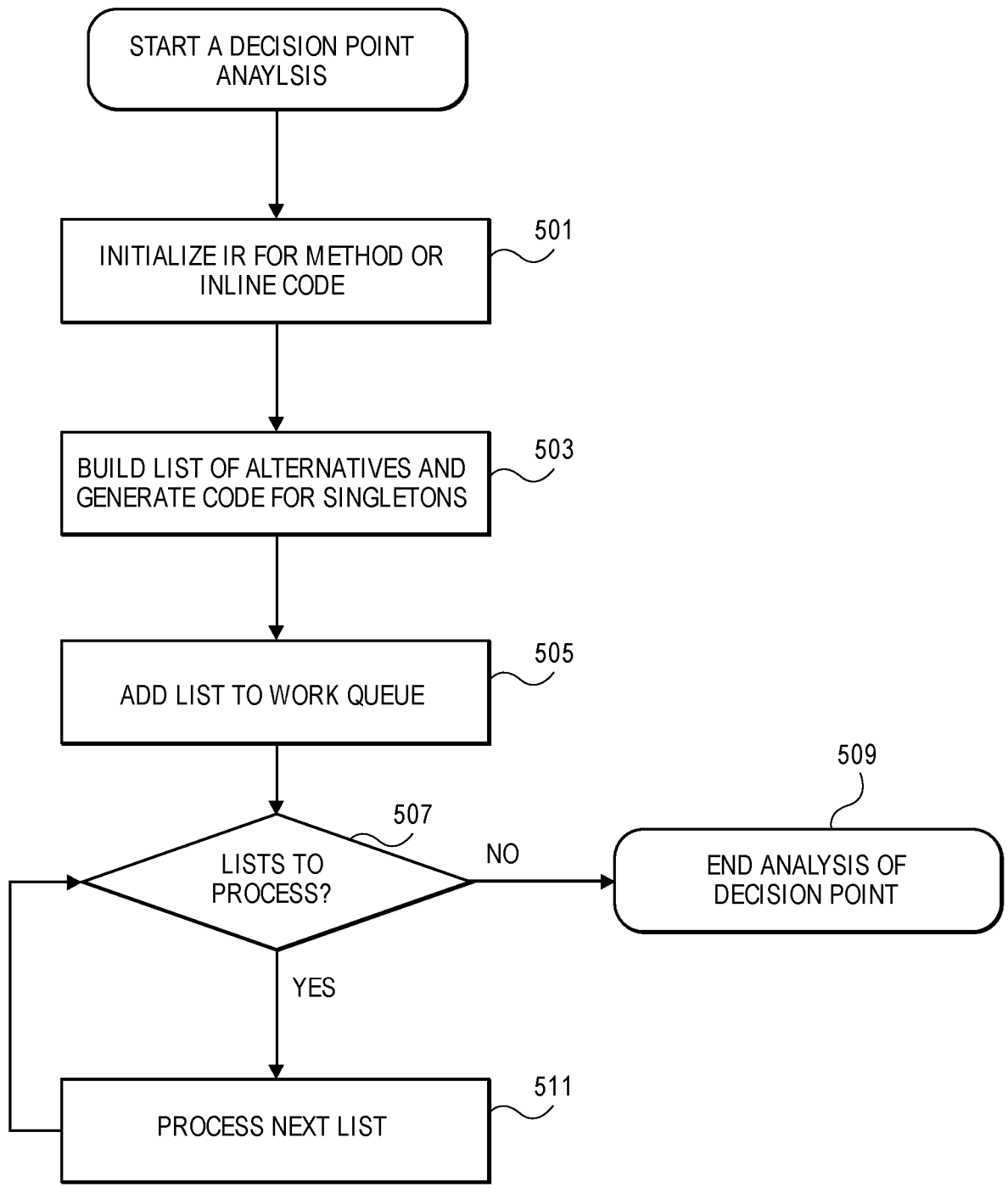
FIG. 5 is a flowchart of one embodiment of the decision point analysis process.

FIG. 5 is a flowchart of one embodiment of the decision point analysis process. This process begins by initializing the IR for method or inline code (Block 501). A list of alternatives is built and code is then generated for alternatives that begin with symbols or collections of symbols that are distinct from those that begin other alternatives (Block 503). The generated list is then added to a work queue (Block 505). The work queue then begins to process each of the lists in the queue until all of the lists have been exhausted at which point the decision point analysis ends (Block 509). A check is made whether lists remain to be processed (Block 507) and while lists remain to be processed a next list is selected and processed (Block 511) other lists may be generated during processing. The processing of each list is described further herein below.

Figure 6:
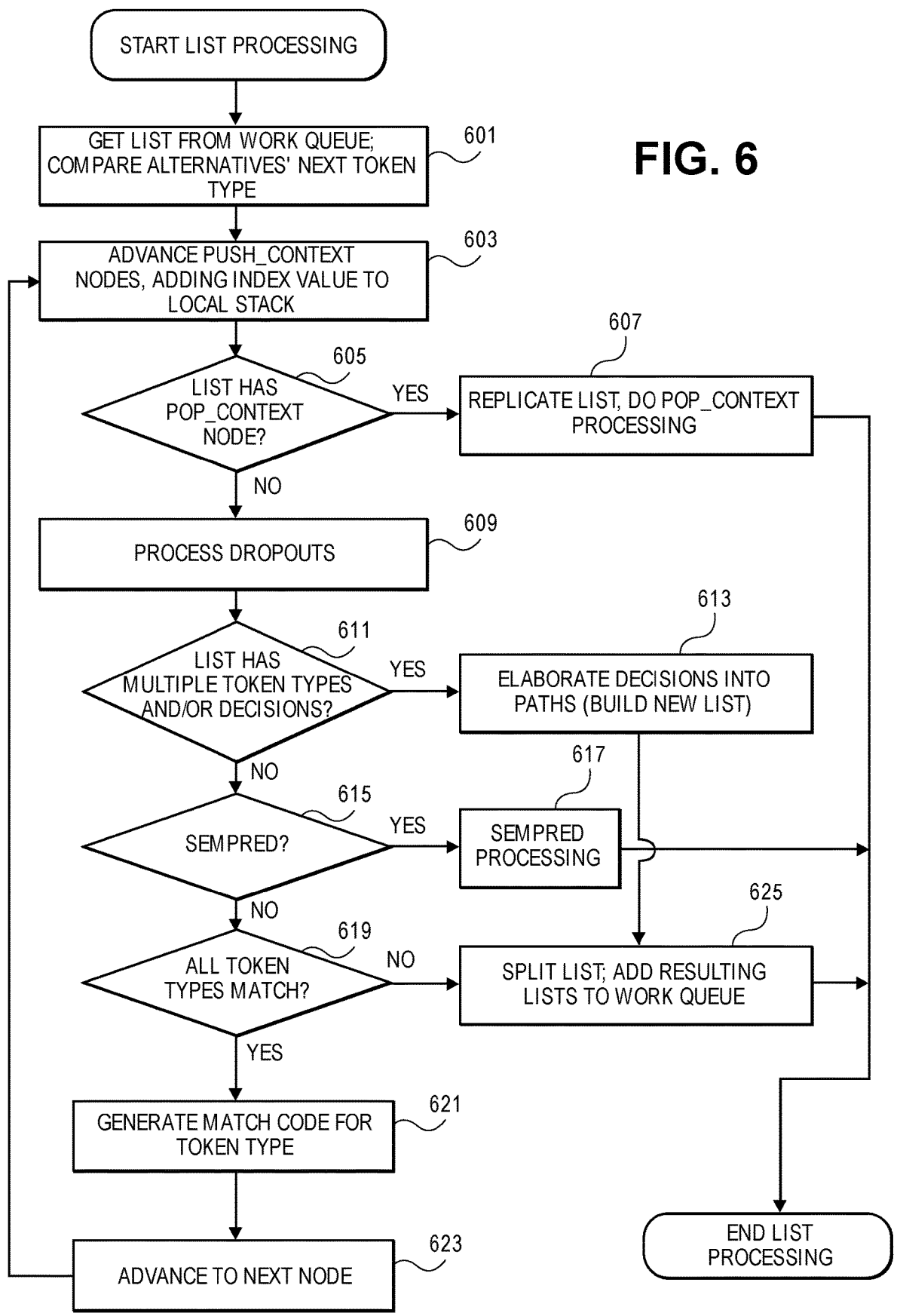
FIG. 6 is a flowchart of one embodiment of the decision point analysis list processing.

FIG. 6 is a flowchart of one embodiment of the decision point analysis list processing. The list processing begins with retrieving a list from a work queue and the comparison of the next token type of each of the alternatives (Block 601). PUSH_CONTEXT nodes are then advanced and an index value is added to the local stack (Block 603). A check is then made whether the list includes a POP_CONTEXT node (Block 605). If a POP_CONTEXT node is included then the list is replicated and the POP_CONTEXT processing is performed before the process completes (Block 607).

PUSH_CONTEXT and POP_CONTEXT nodes represent recursive productions. Recursive productions become dual loop structures in grammar graphs, as illustrated in FIGS. 3A-3D. The second loop has the same number of iterations as the first loop; moreover, when there are multiple alternatives (multiple recursive references), the selection of second loop alternatives depend on the first loop alternative; thus the PUSH_CONTEXT notes which alternative was taken in the first loop, and the POP_CONTEXT retrieves an index value and selects the alternative for the second loop. There are two special cases where one or the other loop disappears: left recursion and tail recursion. Left recursive instances match no terminal symbol from the start of the production to a PUSH_CONTEXT node; in these cases, it makes no sense to pop an index value from the stack when processing the corresponding POP_CONTEXT node since there is no way of determining how many index values should have been pushed onto the stack. Instead, the POP_CONTEXT node is treated as a simple loopback for such alternatives. Similarly, for tail recursion there are no symbols to be matched in loopbacks from the POP_CONTEXT node—any index values on the stack are irrelevant—and no code need be generated for either the PUSH_CONTEXT or POP_CONTEXT instances.

If the list does not include a POP_CONTEXT node, then the processing of dropout—token types or sets of token types that identify a single path, and so terminate the recognition analysis if matched—is performed (Block 609). A check is then made whether the list has multiple token types and/or decision points (Block 611). If there are multiple token types and/or decision points then the process can elaborate decision into paths (e.g. build new list) (Block 613) and then can process the decision points and split the list if necessary and the resulting lists are added to the work queue before completing (Block 625). At decision points, the path lists are compressed to remove null paths and checked against a table of pathlists (the list processing table) and stored context data. If the table contains an entry for the given path list, processing of the list ends, and the list reference is replaced by reference to the table entry. If not, then an entry is added to the table that references the list. This avoids infinite recursion when dealing with loopback decisions. Where there are not multiple token types or decision points, then the process checks for SEMPRED (Block 615), denoting asemantic predicate that tests contextual information to allow or disallow the following alternative. Semantic predicates are simply boolean tests, so lists are split into "if true" and "else" lists and code is generated and code is generated of the form "if (SEMPRED condition) iftrue( ); else if false( ); (Block 617). The "if true" list contains all current alternatives, including the alternative gated by the semantic predicate; the "if false" list omits the predicated alternative. If there is no SEMPRED, then a check is made whether all token types in the list match (Block 619). If the tokens do not match, then the lists are split and the resulting lists are added to the working queue as discussed above (Block 625). If all of the paths in the list refer to the same token type, then a match code is generated for that token type (Block 621). After this completes, the process continues to the next node for processing (Block 623). If not, then the list is split by token type into multiple lists, each of which is added to the work queue, switch code is generated to call the appropriate list function for the matched token type, and list processing terminates.

Figure 7:
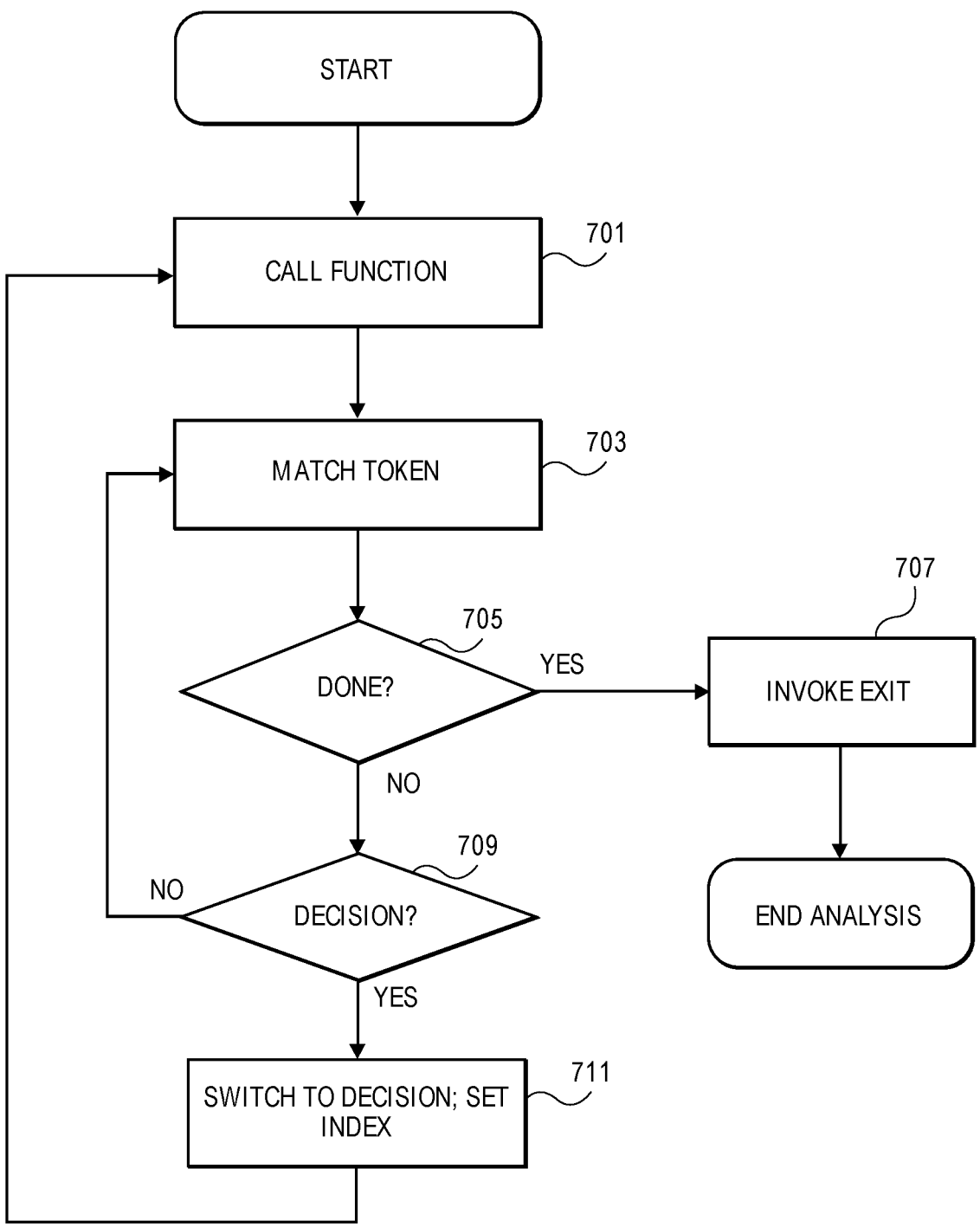
FIGS. 7, 8, and 9 illustrate the simplest version (using the restricted GOTO model) of the runtime analysis process.
Figure 8:
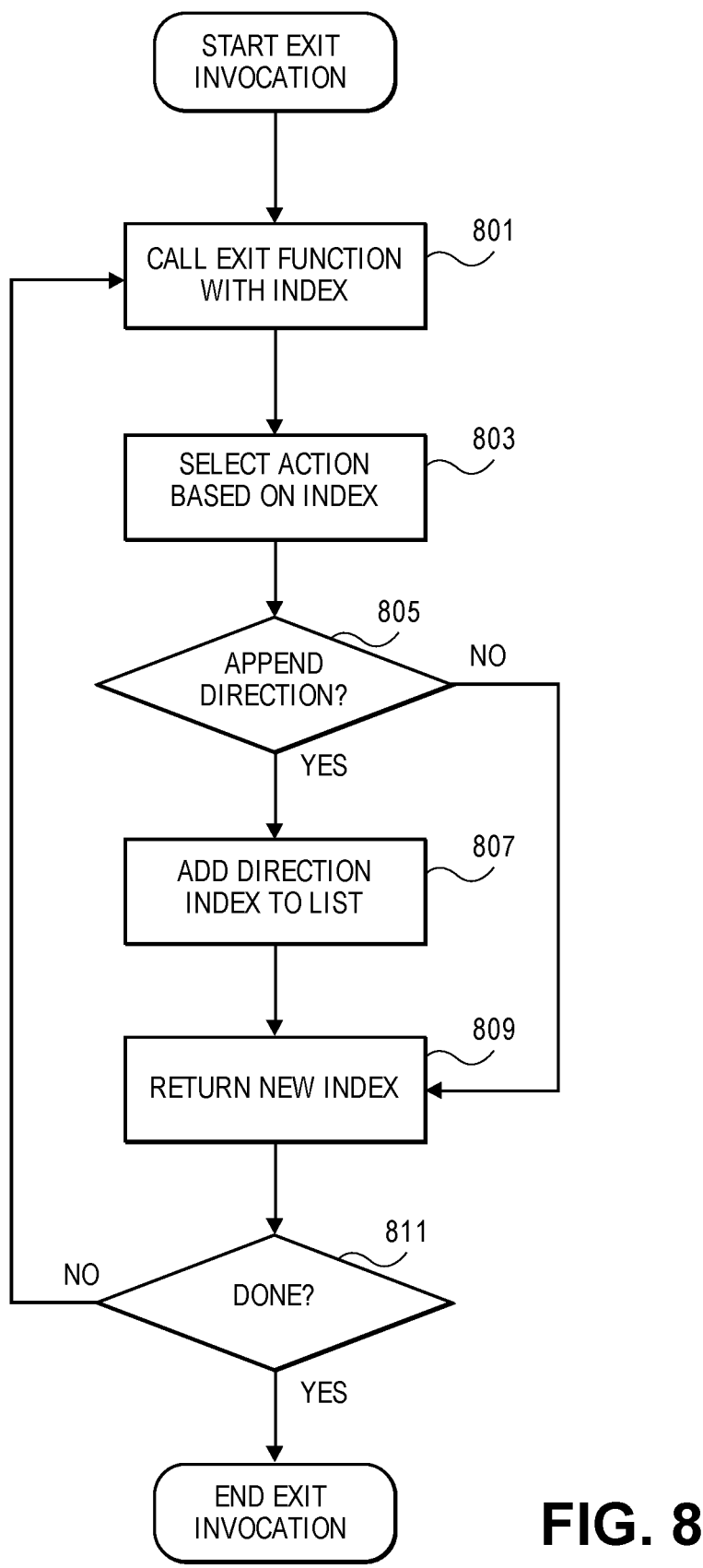
Figure 9:
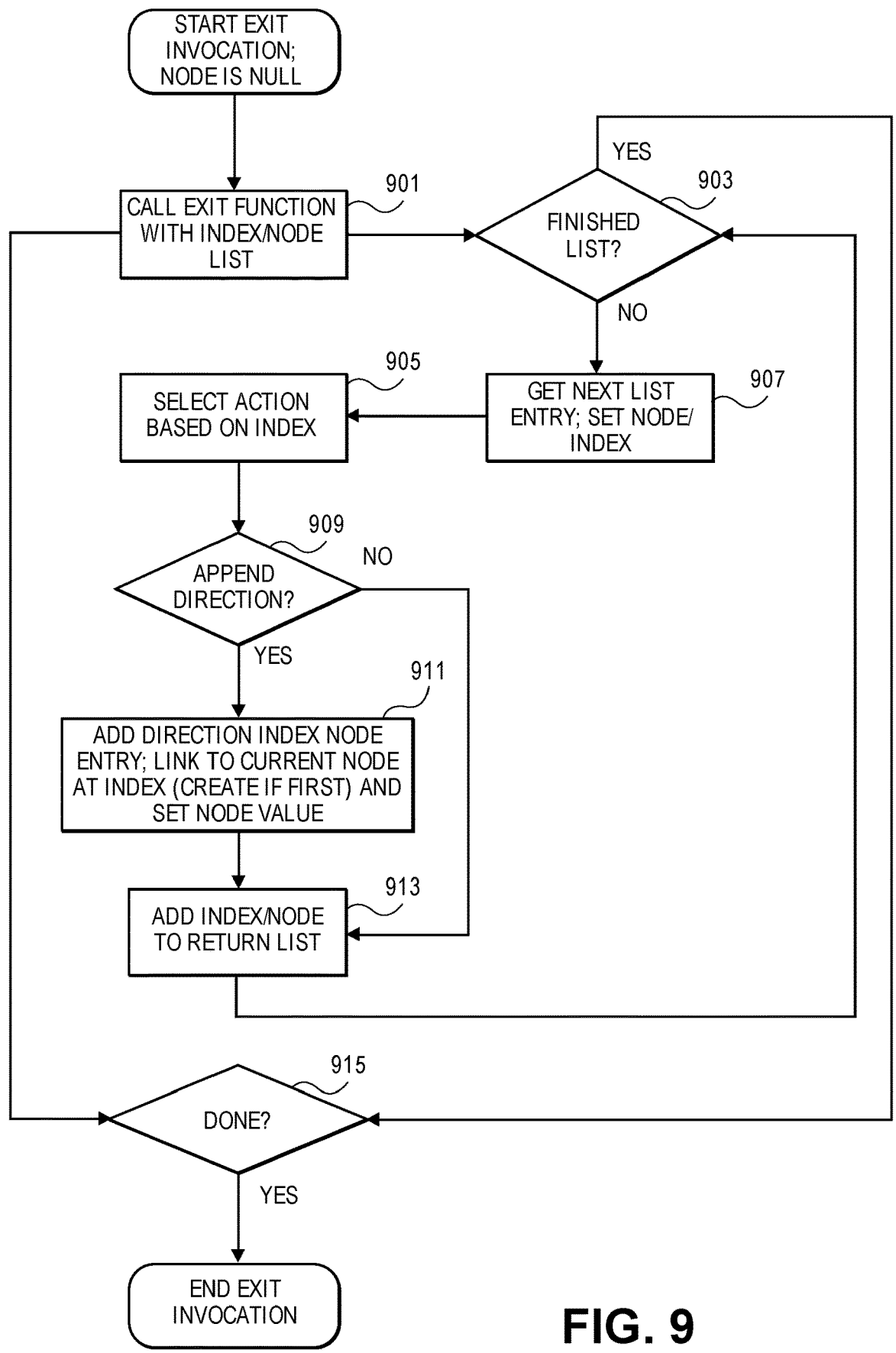
Figure 10:
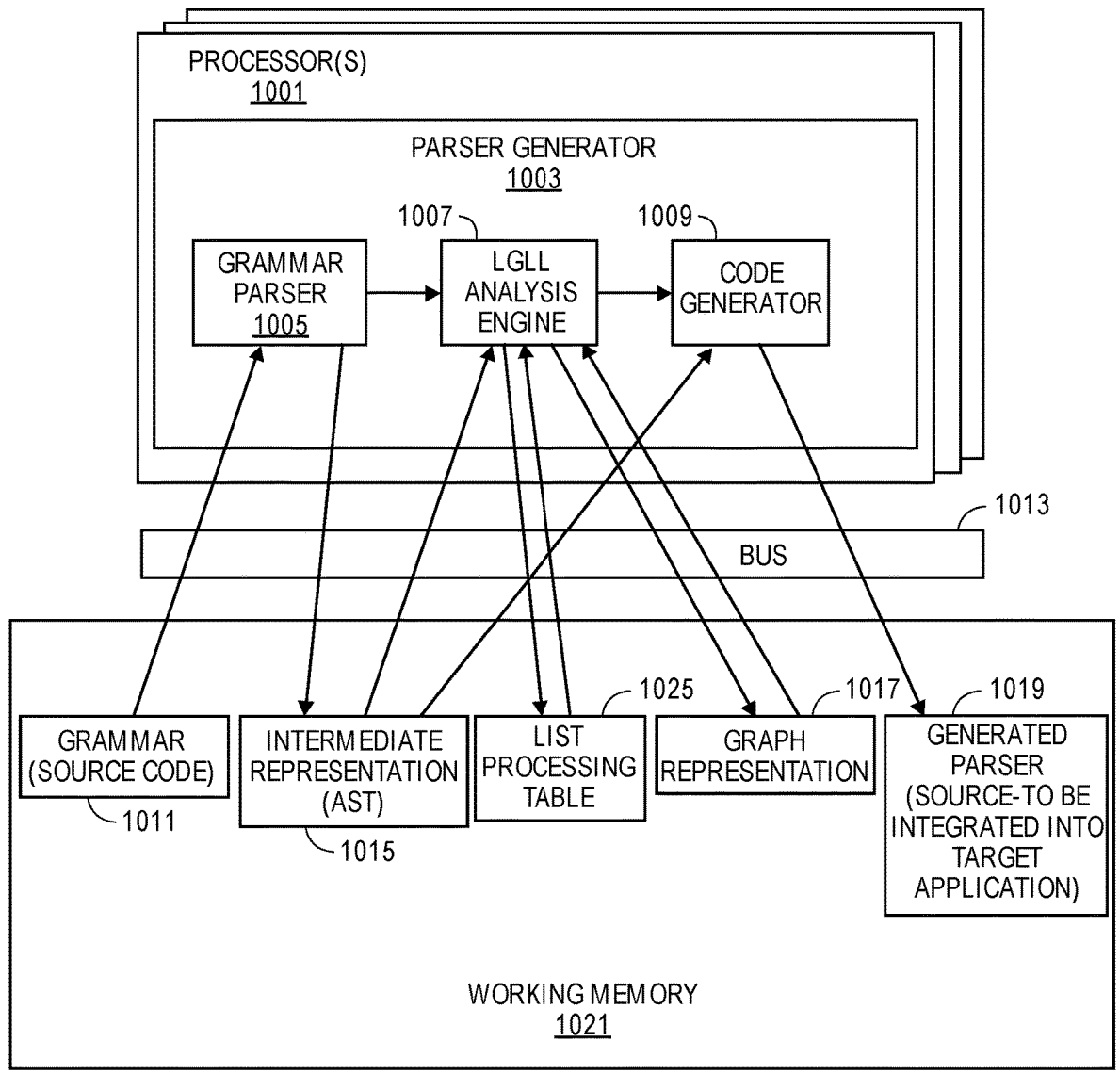
FIG. 10 is a diagram of one embodiment of the parsing system.

FIGS. 7-9 illustrate the simplest version (using the restricted GOTO model) of the runtime recognition process. FIG. 7 provides the general framework, while FIG. 8 shows the process of adding to a direction list and FIG. 9 shows the process of constructing a direction graph. FIGS. 8 and 10 show example code and runtime decisions.

In regard to FIG. 7, the recognition process notionally begins with a call to a recognition function (Block 701). Within the function, tokens are matched (Block 703) and the input stream is advanced to the next token until a decision point or return call is reached. A check is made whether the input stream has been exhausted (Block 705) and if not whether a decision point has been found (Block 709). If exhausted or return call reached the exit is invoked to end the analysis (Block 707). Decisions takes the form of if . . . else . . . then or switch statements to select a function to call and a return index value (Block 711). If a token type fails to be matched or is invalid at a decision point, either an error code is returned or an exception is thrown. Return calls begin the exit process described in FIGS. 9 and 11.

The runtime decisions reflect code generated by the analysis process. The principal runtime decisions that can be encountered, include 1) dropout switch; 2) semantic predicates (SEMPREDs) if ( . . . ) conditionals; 3) POP_CONTEXT looping; 4) split list switch; and 5) function calls (reflect list consolidation/elaboration.

Example Java code for a function with a dropout switch is shown below.

```
protected int loop0_1( ) throws RecognitionException {
    int index = -1;
    match(A, null, "loop: (50, 3) || loop: (52, 4) || loop: (54, 2)");
    token = (PayloadToken) input.next( );
    _type = token.getType( );
    match(B, null, "loop: (50, 5) || loop: (52, 6) || loop: (54, 4)");
    token = (PayloadToken) input.next( );
    _type = token.getType( );
    switch (_type) {
        case C :
            match(C, null, "loop: (50, 7)");
            return endloop0_1(0);
        case D :
            match(D, null, "loop: (52, 8)");
            return endloop0_1(1);
        case E :
            match(E, null, "loop: (54, 6)");
            return endloop0_1(2);
    }
    return -1;
}
```

The code matches A, advances the input stream, matches B, advances input, and then goes to the dropout switch. If C, D, or E are then matched, the endloop0 function is called with an appropriate index value to start the exit processing. If not, then −1 (an error code) is returned.

The example code below shows a typical semantic predicate (baz( ) returns true or false).

```
if (baz( )) {
    return endsempredTest0_21(sempredTest0_35( ));
}
else {
    return endsempredTest0_21(sempredTest0_6( ));
}
```

FIG. 8 is a flowchart that illustrates the exit process when using PEG-style (or other) ambiguity resolution. The call nesting from FIG. 7 is unraveled to construct a direction list and manage recursion stacks. The first step in the exit process is to call an exit function (Block 801). In the example code above, the exit function is endloop0_1 ( )—with an index value; the index value reflects position in the analysis path list and is used to select actions to be performed (Block 803). A check is made whether the action is to be appended to the direction (Block 805). If so, then the process continues by adding a value to the direction list (Block 807), managing a recursion stack, and the like before returning a new index value for further processing (if necessary) (Block 809). When all calls have been processed (Block 811), then the process completes and ends the exit invocation.

The code below provides an example in the form of a simple Java exit function, the function corresponding to the match function set forth above.

```
final private int endloop0_1(int index) {
    switch (index) {
        case 0:
            indexTrack.add(0);
            index = 0;
            break;
        case 1:
            indexTrack.add(1);
            index = 0;
            break;
        case 2:
            index = 1;
            break;
    }
    return index;
}
```

Looking at the previous code, the $0^{th}$ alternative terminates with C and a call to endloop0_1 with index 0. This leads to the indexTrack.add(0) call; this function represents an elaboration of a secondary decision, so a '0' direction index is inserted into the direction list, and the index value reverted to the index from the pre-elaboration list. The D/1 case is similar, while the E case represents a holdover path from a previous decision. Thus the #3 case only affects the index value returned.

The code presented below provides an example of a complete Java example for a recognizer and the grammar (single production) from which it is generated.

Grammar

```
recursionGenTest
    :
    A
    (
        ( B C D )+ E
        |
        ( B C D )+ F
    )
    ;
```

Generated Recognizer Code

```
public class Recognizer extends BaseRecognizer<PayloadToken> {
    PayloadToken token;
    protected int recursionGenTest0_1( ) throws RecognitionException {
        match(B, null, "recursionGenTest: (263, 5) || recursionGenTest:
            (265, 6)");
        token = (PayloadToken) input.next( );
        _type = token.getType( );
        match(C, null, "recursionGenTest: (263, 7) || recursionGenTest:
            (265, 8)");
        token = (PayloadToken) input.next( );
        _type = token.getType( );
        match(D, null, "recursionGenTest: (263, 9) || recursionGenTest:
            (265, 10)");
        token = (PayloadToken) input.next( );
        _type = token.getType( );
        if (_type == E) {
            match(E, null, "recursionGenTest: (263, 11)");
            return endrecursionGenTest0_1(0);
        }
        else if (_type == F) {
            match(F, null, "recursionGenTest: (265, 12)");
            return endrecursionGenTest0_1(1);
        }
        return endrecursionGenTest0_1(recursionGenTest0_1( ));
    }
    public int recursionGenTest0( ) throws RecognitionException {
        return endrecursionGenTest0(recursionGenTest0_1( ));
    }
```

```
// translators to do index conversions
final private int endrecursionGenTest0(int index) {
    switch (index) {
        case 1:
            indexTrack.add(0);
            break;
        case 2:
            indexTrack.add(1);
            break;
    }
    return index;
}
final private int endrecursionGenTest0_1(int index) {
    switch (index) {
        case 1:
            indexTrack.add(0);
            index = 0;
            break;
        case 2:
            indexTrack.add(0);
            index = 1;
            break;
    }
    return index;
}
}
```

This particular example generates a recursive recognizer, and has some points of interest. The top level function, recursionGenTest0( ), represents the decision begun by the first '('. The endrecursionGenTest0( ), function builds the index list entry for that decision, and recursionGenTest0_1 ( ) represents the two (B C D)+ loops and their following E or F—note the endrecursionGenTest0_1( ) contribution to the index list. The body of the function matches B C D, then either matches E or F and rewinds the call stack, or makes a recursive call. The net result is that a call to recursionGenTest0( ) builds an index list of the form {0|1, (0)+}.

Corresponding Parse Function

```
// analysisTest.g:259:1: recursionGenTest : A ( (B C D )+ E | ( B C D
)+ F ) ;
public void recursionGenTest( ) throws RecognitionException {
    try {
        match(A,null);
        // analysisTest.g:262:2: ( (B C D )+ E | ( B C D )+ F )
        if (indexTrack.getCursor( ).getLink( ) == null) {
            input.setToAnalyze( );
            altSelect = analyzer.recursionGenTest0( );
            input.setToParse( );
        }
        altSelect = indexTrack.next( );
        switch (altSelect) {
            case 1 :
                // analysisTest.g:263:3: ( B C D )+ E
                {
                    do {
                        switch (altSelect) {
                            case 1 :
                                // analysisTest.g:263:5: B C D
                                match(B,null);
                                match(C,null);
                                match(D,null);
                                break;
                        }
                        if (indexTrack.getCursor( ).getLink( ) == null) {
                            input.setToAnalyze( );
                            if (_type == E)
                                altSelect = 0;
                            else if (set0.data.contains(_type))
                                altSelect = 1;
                            input.setToParse( );
                        }
                        altSelect = indexTrack.next( );
                    } while (altSelect > 0);
                    match(E,null);
                }
                break;
            case 2 :
                // analysisTest.g:265:4: ( B C D )+ F
                {
                    // analysisTest.g:265:4: ( B C D )+
                    do {
                        switch (altSelect) {
                            case 1 :
                                // analysisTest.g:265:6: B C D
                                match(B,null);
                                match(C,null);
                                match(D,null);
                                break;
                        }
                        if (indexTrack.getCursor( ).getLink( ) == null) {
                            input.setToAnalyze( );
                            if (_type == F)
                                altSelect = 0;
                            else if (set0.data.contains(_type))
                                altSelect = 1;
                            input.setToParse( );
                        }
                        altSelect = indexTrack.next( );
                    } while (altSelect > 0);
                    match(F,null);
                }
                break;
        }
    }
    catch (RecognitionException re) {
        reportError(re);
        recover(re);
    }
}
```

The parsing code matches A, then evaluates the direction list before reaching the decision switch. The first case matches B, C, and D before reaching the loop decision point, and again checks the decision list. If the list is empty, then the inlined recognition code executes; an E ends the loop, while a B (contents of set0) leads to continued looping. The second case is similar, with F replacing E.

FIG. 9 is a flowchart of one embodiment of a flowchart that shows the generalized exit process, involving construction of a direction graph rather than the direction list of FIG. 8. The two processes are very similar, but this process loops through a return list to construct a new return list rather than dealing with single-valued returns. The process begins with the call of the exit function with an index or node list (Block 901). A check is made whether the list is empty (Block 903), if so then the process completes after a final completion check (Block 915). If there are still items in the list, then the process gets the next list entry, sets the node and index (Block 907). An action is selected based on the index (Block 905). If the action is to be appended to the direction, then the process adds the direction list index node entry, links to the current node at the index (which is created if the first node) and the node value is set (block 911). The index or node is added to the return list (Block 913). The list is again checked to determine if it is empty (block 903), if not then the process continues with the next list entry otherwise the process ends if completed (Block 915).

FIG. 10 is a diagram of one embodiment of a computer system implementing the parsing process. The computer system can include a processor 1001 or set of processors to execute a parser generator 1003 implementing the parsing processes described herein. In another embodiment, the parser generator 1003 and associated processes can be executed in a distributed manner across multiple computer systems in communication with one another. For sake of clarity, an embodiment executed within a single computer system is described herein below. However, one skilled in the art would understand that the principles and structures described herein are consistent with other embodiments having other configurations such as distributed implementations.

In one embodiment, the parser generator 1003 includes a grammar processor 1005 front end for processing an input grammar to AST, a Linear Generalized LL (LGLL; the LL stands for "left leaning" parse tree, and is shorthand notation for top-down parsing) analysis engine 1007 and code generator 1009 to create the recognizer and parser code, which divide the responsibilities of parsing input grammars and generating code as described herein above. The grammar parser 1005 takes the source code 1011 as an input and generates the intermediate representation (AST) 1015 as set forth above. The LGLL analysis engine 1007 takes the AST as input and as set forth above generates the graph representation 1017. It then processes the graph as described in FIGS. 4-6, building and using a list processing table 1025 to avoid repeated list analysis. The code generator 1009 processes the AST 1015 and the graph representation 1017 using the functions described herein above to construct the generated parser 1019, which is a source to be integrated into a target application.

The grammar 1011, AST 1015, graph representation 1017, list processing table 1025, and generated parser 1019 can be stored in a working memory 1021 of the computer system and are accessible to the parser generator 1003 over a bus 1013 or similar interconnect. The processors 1001 can communicate over a bus 1013, chip-level or system area network, or similar communication system with a working memory 1021 storing the source code 1015, intermediate representation 1015, graph representation 1017 and generated parser 1019. The working memory 1021 can be any type of storage device such as solid state random access memory. The working memory 1021 can store any of the above-mentioned data structures in addition to storing compiled code, the working memory 1021 and persistent storage devices (not shown) are responsible for storing the executable of the compilers and parsers and their subcomponents.

The working memory 1021 can be in communication with the processors 1001 over the bus 1013. However, one skilled in the art would understand that the bus 1013 does not strictly indicate that only a bus separates the processors 1001 and the bus 113 can include intermediate hardware, firmware and software components that implement the communication between the processor 1001 and the compiler parser generator 1003. One skilled in the art would understand that the computer system is provided by way of example and not limitation and that well-known structures and components of a computer system have been omitted for sake of clarity.

In one embodiment, the parser generator and parser components implement the functions described with relation to FIGS. 4-9, to generate an intermediate representation of the code to be utilized in generating an executable or similar output. The parser can be implemented as part of the front-end compiler, distributed over multiple components of the compiler or can be implemented separate from the compiler. In other embodiments, the parser is not utilized in a software compilation process, but rather is utilized in other types of code processing such as DNA sequence processing or similar naturally occurring or artificially created data sequences. One skilled in the art would understand that the processes and structures described herein with relation to software compilation are applicable or adaptable to processing other code for other contexts.

Figure 11:
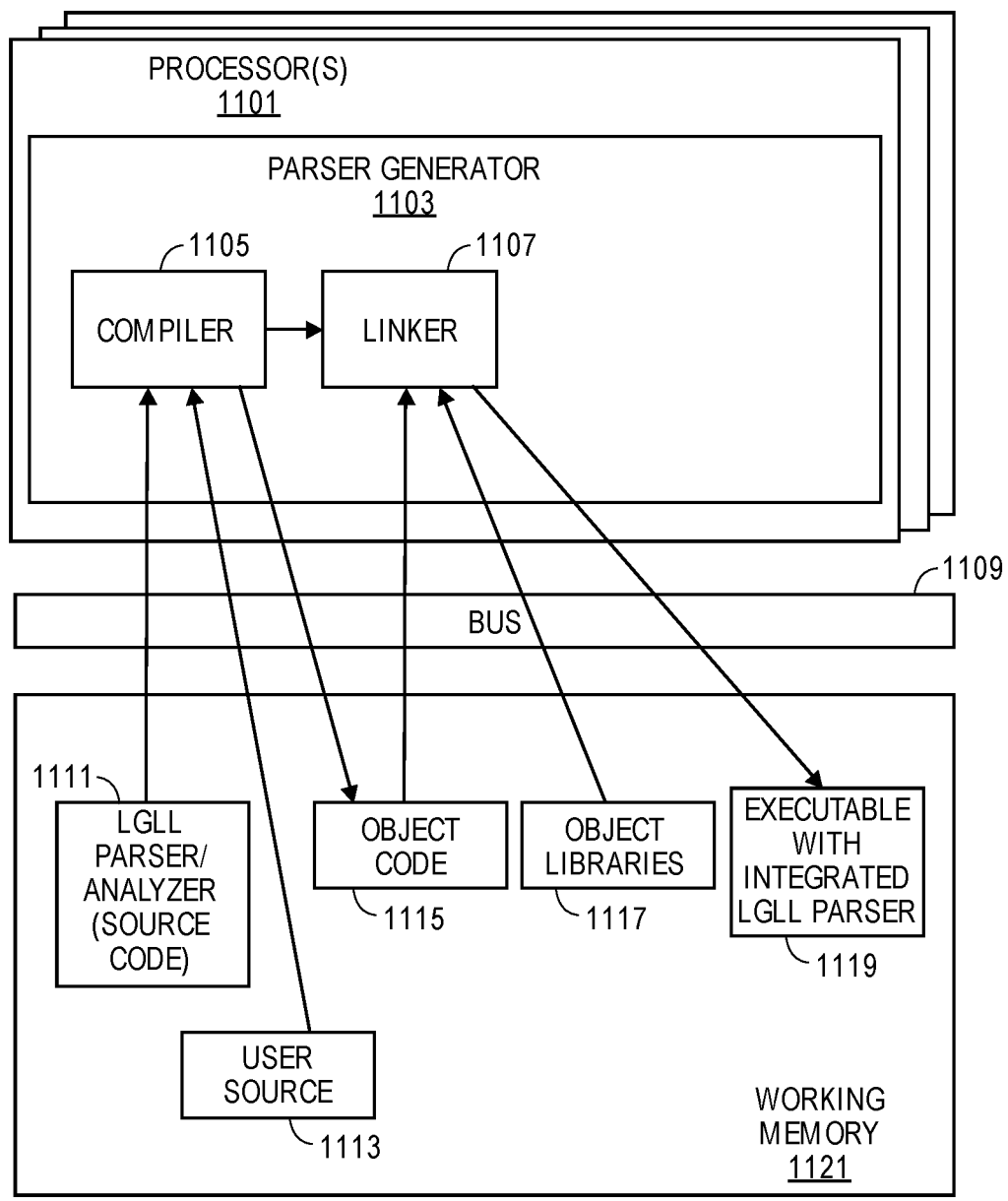
FIG. 11 is a diagram of one embodiment of the compiler and linker system.

FIG. 11 is a diagram of a further computer system embodiment of the parsing process. The computer system including processors 1101 executes the parser generator 1103 including a compiler 1105 and linker 1107. The compiler can include the parser as described herein above or can operate on the output of the parser and works with the linker to generate the executable. The compiler 1105 is separate from the compiler and may execute as a parallel process, especially for large programs. The compiler 1105 reads in the LGLL parser/analyzer (source code), and the user source code and generates the object code.

The linker 1107 is then responsible for generating executable code 1119 with the integrated LGLL parser 1119, by operating over the object code 1115 and libraries 1117. The linker 1107 links together object code 1115 generated by the compiler to create the executable 1119 that can run on the target platform. The linker 1107 combines the individual object code 1115 with library code 11117 and other object code similar code to enable platform specific operation and execution of the source code.

Figure 12:
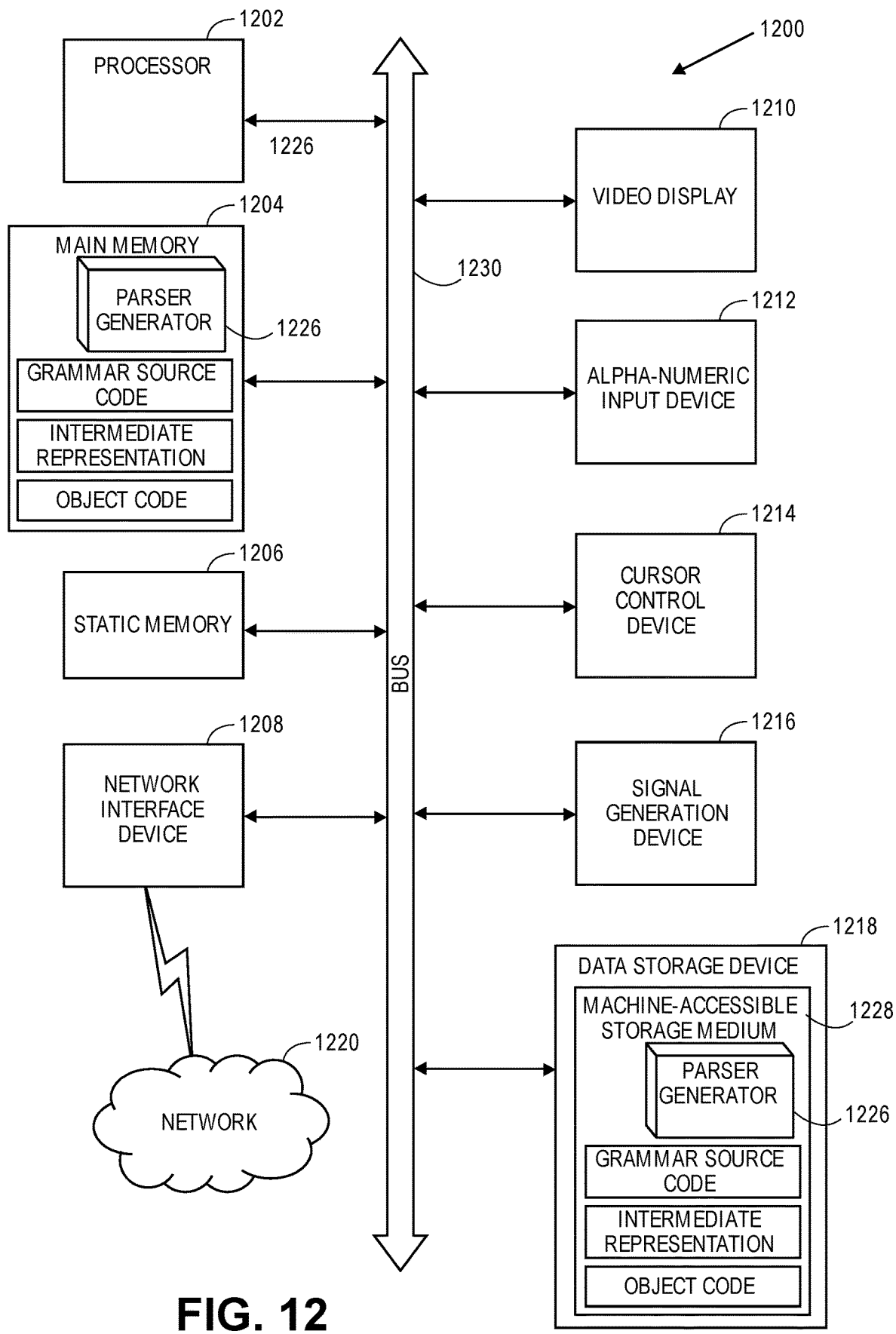
FIG. 12 is a diagram of one embodiment of a computer system implementing the parsing process.

FIG. 12 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus.

The processing device 1202 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute a compiler 926 and/or parser for performing the operations and steps discussed herein.

The computer system 900 may further include a network interface device 908. The computer system also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 916 (e.g., a speaker).

The secondary memory 1218 may include a machine-readable storage medium 1228 (or more specifically a non-transitory computer readable storage medium) on which is stored one or more sets of instructions (e.g., the parser and/or compiler 1226) embodying any one or more of the methodologies or functions described herein (e.g., the parser generator 1226). The parser generator 1226 (i.e., implementing the method described in this document) may also reside, completely or at least partially, within the main memory 1204 and/or within the processing device 1202 during execution thereof by the computer system 1200; the main memory 1204 and the processing device also constituting machine-readable storage media. The compiler 1228 may further be transmitted or received over a network via the network interface device 1208.

The machine-readable storage medium 1228, which may be a non-transitory computer readable storage medium, may also be used to store the parser generator 1226 module persistently. While the non-transitory computer readable storage medium is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 1200 may additionally include the parser generator 1226 for implementing the functionalities of the compilation process described above. The module, components and other features described herein can be implemented as discrete hardware components or integrated in the functionality of hardware components such as ASICS, FPGAs, DSPs or similar devices. In addition, the module can be implemented as firmware or functional circuitry within hardware devices. Further, the module can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "determining," "setting," "converting," "constructing," "traversing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed:

1. A computer implemented method of parsing in which a parsing process sequentially matches tokens from a stream of tokens until a decision point is reached having a plurality of subsequent alternative sequences of tokens, the method comprising:

taking a next value from a list of decision values to determine which of a plurality of alternative sequences to follow, after invoking a recognition function to refill the list of decision values in response to the list of decision values being empty, where the recognition function determines a token position in the stream of tokens, then sequentially matches tokens until only one alternative path remains;

calling a function specific to a decision point in response to encountering a secondary decision point, or pushing a return function pointer on a stack of pointers followed by a goto to code for the decision point;

determining whether the stream of tokens is exhausted;

constructing a list or multi-list of decision values in response to a single one alternative path remaining in the list of decision values; and selecting one list to continue the parsing process.

2. The computer-implemented method of claim 1, further including grammar analysis to construct the parsing process, the method further comprising:

parsing grammar to create an intermediate representation that will be used in parse code generation;

constructing a graph for analysis of the intermediate representation that represents all features of the grammar including recursion, alternation, grouping of alternatives, and looping;

processing each decision point in the graph to generate an intermediate representation for generating recognition code;

generating code for the recognition functions that will return lists of directions at parser runtime;

patching each decision point in the intermediate representation to reference the recognition code for that decision point; and generate parse code from the intermediate representation.

3. The computer-implemented method of claim 1, wherein decision point recognition terminates when either the stream of tokens is exhausted or a return call is encountered to pass control back to a parser.

4. The computer-implemented method of claim 3, the method further comprising:

unwinding a stack of return actions or functions by passing index values from a first return function to a second subsequent return function, where each function selects an action based on an index; and adding a direction list index node entry for each primary or secondary decision point encountered as the corresponding return action is executed, linking the direction list entry to a current node at the index.

5. The computer-implemented method of claim 4, wherein syntactic ambiguities result in return actions that pass multiple index values to subsequent return actions to create a plurality of direction lists, each of the plurality of direction lists to direct a separate parse.

6. The computer implemented method of claim 4, wherein syntactic ambiguities are resolved by selecting one of a plurality of syntactic ambiguity alternatives.

7. The computer-implemented method of claim 5, the method further comprising:

parsing using a current direction list entry to determine which path to follow from a current decision point.

8. A non-transitory machine-readable medium having stored therein a set of instructions, which when executed by a computer system cause the computer to perform a set of operations for a method of parsing in which a parsing process sequentially matches tokens from a stream of tokens until a decision point is reached having a plurality of subsequent alternative sequences of tokens, the operations comprising:

taking a next value from a list of decision values to determine which of a plurality of alternative sequences to follow, after invoking a recognition function to refill the list of decision values in response to the list of decision values being empty, where the recognition function determines a token position in the stream of tokens, then sequentially matches tokens until only one alternative path remains;

calling a function specific to a decision point in response to encountering a secondary decision point, or pushing a return function pointer on a stack of pointers followed by a goto to code for the decision point;

determining whether the stream of tokens is exhausted;

constructing a list or multi-list of decision values in response to a single one alternative path remaining in the list of decision values; and selecting one list to continue the parsing process.

9. The non-transitory machine-readable medium of claim 8, having further instructions stored therein to cause the computer to perform operations including grammar analysis to construct the parsing process, the operations further comprising: parsing grammar to create an intermediate representation that will be used in parse code generation; constructing a graph for analysis of the intermediate representation that represents all features of the grammar including recursion, alternation, grouping of alternatives, and looping; processing each decision point in the graph to generate an intermediate representation for generating recognition code; generating code for the recognition functions that will return lists of directions at parser runtime; patching each decision point in the intermediate representation to reference the recognition code for that decision point; and generate parse code from the intermediate representation.

10. The non-transitory machine-readable medium of claim 8, wherein decision point recognition terminates when either the stream of tokens is exhausted or a return call is encountered to pass control back to a parser.

11. The non-transitory machine-readable medium of claim 10, the method further comprising:

unwinding a stack of return actions or functions by passing index values from a first return function to a second subsequent return function, where each function selects an action based on an index; and adding a direction list index node entry for each primary or secondary decision point encountered as the corresponding return action is executed, linking the direction list entry to a current node at the index.

12. The non-transitory machine-readable medium of claim 11, wherein syntactic ambiguities result in return actions that pass multiple index values to subsequent return actions to create a plurality of direction lists, each of the plurality of direction lists to direct a separate parse.

13. The non-transitory machine-readable medium of claim 11, wherein syntactic ambiguities are resolved by selecting one of a plurality of syntactic ambiguity alternatives.

14. The non-transitory machine-readable medium of claim 11, the method further comprising:

parsing using a current direction list entry to determine which path to follow from a current decision point.

15. A computer system configured to implement a method of parsing in which a parsing process sequentially matches tokens from a stream of tokens until a decision point is reached having a plurality of subsequent alternative sequences of tokens, the computer system comprising:

a non-transitory machine-readable medium to store a source code and a parser generator; and a processor to execute the parser generator, the parser generator to take a next value from a list of decision values to determine which of a plurality of alternative sequences to follow, after invoking a recognition function to refill the list of decision values in response to the list of decision values being empty, where the recognition function determines a token position in the stream of tokens, then sequentially matches tokens until only one alternative path remains, to call a function specific to a decision point in response to encountering a secondary decision point, or pushing a return function pointer on a stack of pointers followed by a goto to code for the decision point, to determine whether the stream of tokens is exhausted, to construct a list or multi-list of decision values in response to a single one alternative path remaining in the list of decision values, and to select one list to continue the parsing process.

16. The computer system of claim 15 wherein the parser generator is further to perform grammar analysis to construct the parsing process, including parsing grammar to create an intermediate representation that will be used in parse code generation, constructing a graph for analysis of the intermediate representation that represents all features of the grammar including recursion, alternation, grouping of alternatives, and looping, processing each decision point in the graph to generate an intermediate representation for generating recognition code, generating code for the recognition functions that will return lists of directions at parser runtime, patching each decision point in the intermediate representation to reference the recognition code for that decision point, and to generate parse code from the intermediate representation.

17. The computer system of claim 15, wherein decision point recognition terminates when either the stream of tokens is exhausted or a return call is encountered to pass control back to a parser.

18. The computer system of claim 17, the method further comprising:
   unwinding a stack of return actions or functions by passing index values from a first return function to a second subsequent return function, where each function selects an action based on an index; and
   adding a direction list index node entry for each primary or secondary decision point encountered as the corresponding return action is executed, linking the direction list entry to a current node at the index.

19. The computer system of claim 18, wherein syntactic ambiguities result in return actions that pass multiple index values to subsequent return actions to create a plurality of direction lists, each of the plurality of direction lists to direct a separate parse.

20. The computer system of claim 18, wherein syntactic ambiguities are resolved by selecting one of a plurality of syntactic ambiguity alternatives.

* * * * *